United States Patent [19]

Weiss et al.

[11] Patent Number: 4,805,105
[45] Date of Patent: Feb. 14, 1989

[54] METHOD AND SYSTEM FOR ELECTRICALLY CONTROLLING BRAKING OF A VEHICLE

[75] Inventors: Eberhard Weiss, Hemmingen; Manfred Stahl, Stuttgart; Helmut Domann, Leonberg; Erich Jung, Mühlacker; Franz Maurer, Kempten, all of Fed. Rep. of Germany

[73] Assignee: Robert Bosch GmbH, Stuttgart, Fed. Rep. of Germany

[21] Appl. No.: 938,024

[22] Filed: Dec. 4, 1986

[30] Foreign Application Priority Data

Dec. 6, 1985 [DE] Fed. Rep. of Germany ....... 3543145

[51] Int. Cl.$^4$ ................................................. B60T 8/00
[52] U.S. Cl. ............................. 364/424.02; 340/52 C; 303/DIG. 3
[58] Field of Search ................ 364/426; 180/197; 340/52 C; 303/95, 103, 110, DIG. 3–DIG. 4

[56] References Cited

U.S. PATENT DOCUMENTS

| | | | |
|---|---|---|---|
| 4,320,459 | 3/1982 | Lindemann et al. | 364/426 |
| 4,466,066 | 8/1984 | Saumweber et al. | 364/426 |
| 4,489,382 | 12/1984 | Jonner et al. | 364/426 |
| 4,585,280 | 4/1986 | Leiber | 303/DIG. 4 |
| 4,591,986 | 5/1986 | Nakajima et al. | 364/426 |
| 4,637,663 | 1/1987 | Matsuda | 364/426 |
| 4,660,896 | 4/1987 | Matsuda | 364/426 |

Primary Examiner—Gary Chin
Attorney, Agent, or Firm—Frishauf, Holtz, Goodman, Woodward

[57] ABSTRACT

A brake control system has a controller (52, 53, 54) including hysteresis. To prevent over-shoot of control operation if a comparison between actual braking pressure ($P_{act}$) and commanded pressure ($P_{com}$) is applied to control valves which, for example, operate pneumatically, so that the brakes will not instantaneously respond, a difference pressure threshold ($\Delta P_G$) is determined and, when the difference pressure level is passed by the difference pressure signal, the valves are controlled to operate in pulse operation, in which each pressure pulse ($T_E$) is followed by a quieting or pressure-OFF time ($T_{BER}$). The pulse sequence and the timing of pulses and pulse gaps is controllable in accordance with pressure levels, operating parameters, pressure difference levels and the like.

36 Claims, 9 Drawing Sheets

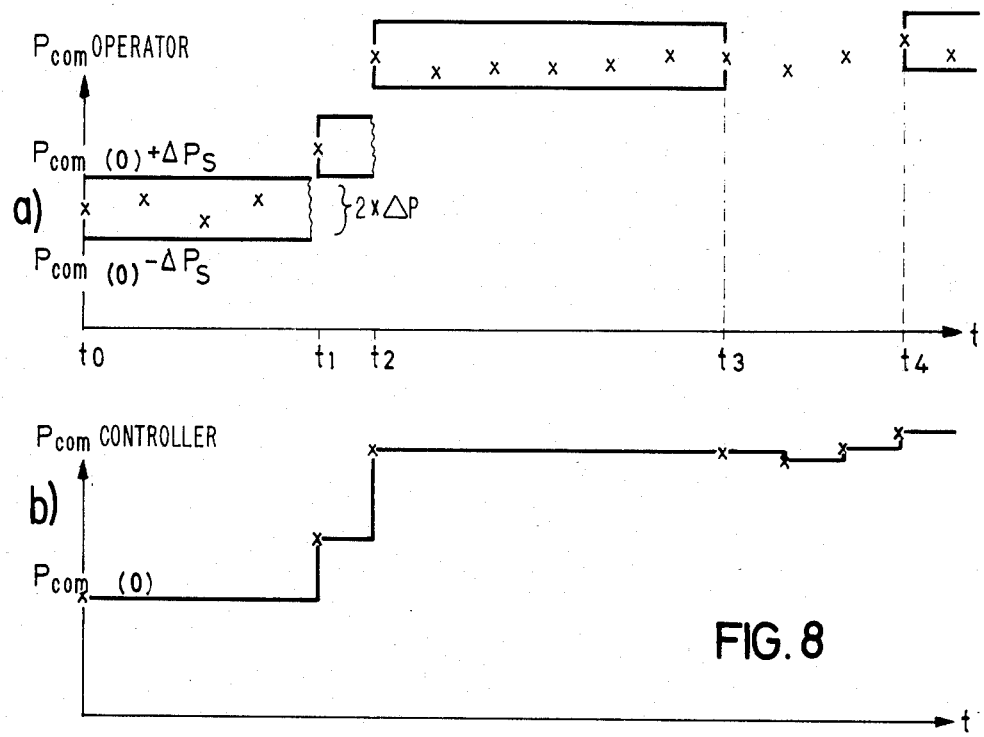
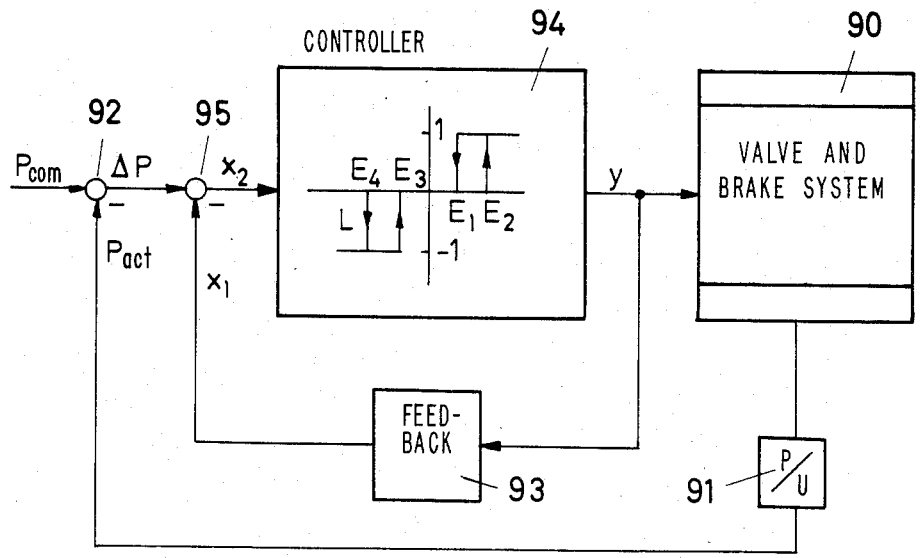
FIG. 8
FIG. 9

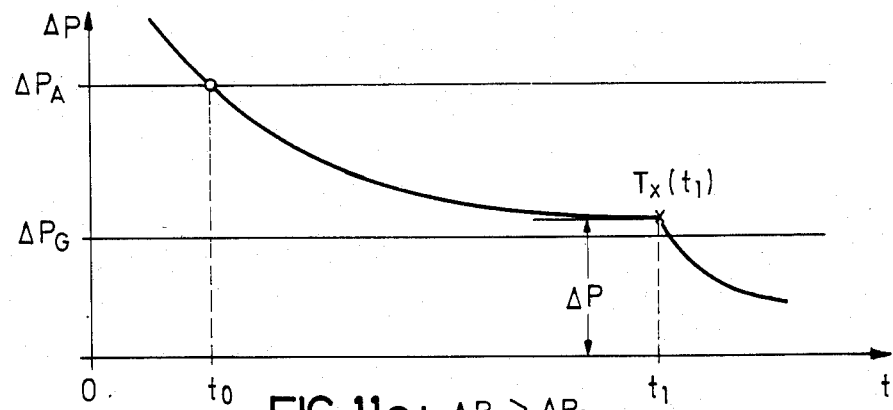
FIG.11a: $\Delta P > \Delta P_G$
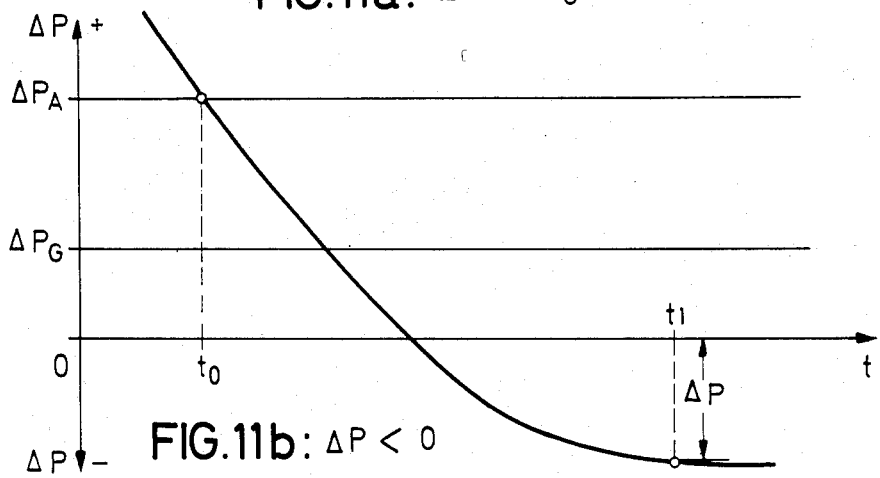
FIG.11b: $\Delta P < 0$
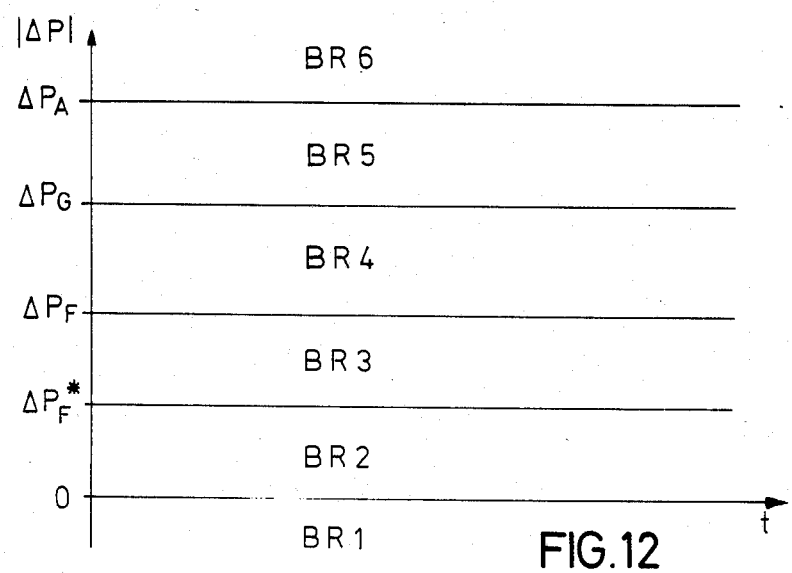
FIG.12

METHOD AND SYSTEM FOR ELECTRICALLY CONTROLLING BRAKING OF A VEHICLE

REFERENCE TO RELATED PUBLICATIONS:

German Patent Disclosure Document DE-OS No. 21 28 169=U.S. Pat. No. 3,790,225.

German Patent Disclosure Document DE-OS No. 23 27 508=GB-Patent Specification No. 1465613.

The present invention relates to braking systems and methods for a vehicle, in which a vehicle operator provides a command value which is converted into a command signal, the command signal then is compared with an actual braking effort signal and, if a difference is sensed, the actual braking effort is changed to null the difference; and more particularly to such a signal in which hunting is essentially eliminated and the effects of delayed responses of brake control structures including non-linear responses due to compressible brake fluid media, such as compressed air, are compensated for.

BACKGROUND

It is known to control braking effort by providing pressurized brake fluid, which is applied to brake cylinders under control of electromagnetic valves. A controller is provided, which is responsive to various switching thresholds to control the electromagnetic valves. The electromagnetic valves are located between a pressure source and one or more of the vehicle brakes themselves, and control, respectively, increase in braking pressure, decrease of braking pressure, for example by drainage of brake fluid, and maintenance of a certain braking pressure, and hence certain braking effort, by closing a fluid circuit to the brake so that the brake fluid under the previously provided pressure is trapped therein and continues to apply the braking pressure, maintaining it constant.

Braking systems of the type generally described above are described in the literature, in which respective parameters, such as actual braking pressure $P_B$, or vehicle deceleration $V_F$ or wheel slippage is used as a comparison parameter to indicate braking effort. U.S. Pat. No. 3,790,225 discloses a system in which actual braking pressure $P_B$ is the actual braking effort parameter; GB-PS No. 1465613 discloses a system in which vehicle deceleration is the actual effect parameter.

Brake control systems may use pressurized hydraulic fluid or compressed air as the pressure medium; some systems use a combination of both. Some time delay is unavoidable between sensing of a command value, that is, operation of a command element such as a brake pedal, and the beginning of build-up of brake fluid pressure. As the brake fluid pressure increases, the pressure sensor provides a feedback or response signal representative of actual pressure. When the command value determines the pressure to be commanded, a delay will arise before the actual pressure will reach the commanded value. This delay is due to the effect of hydraulic or pneumatic connection lines, delayed in operation of the electrically controlled valves which control flow of brake fluid, and the like. Consequently, brake control systems of the simple type in which only a comparison between actual braking pressure and commanded braking pressure is made, will result in hunting of the actual braking pressure level about the command value. Such hunting causes repeated operation of the magnetic valve for, respectively, admitting and draining pressurized brake fluid.

THE INVENTION

It is an object to improve brake control systems such that hunting is prevented, and sequential oscillation of the braking pressure about a command value is reduced, thereby reducing wear and tear on the brake valve and decreasing use of brake fluid.

Briefly, a determination is made if the difference $\Delta$ between a signal representing commanded parameter and actual parameter exceeds or is below a predetermined level, representing a predetermined parameter difference. The controlled valves, typically electromagnetically operated valves, are then controlled, if the difference $\Delta$ representing the parameter difference:

(1) is above said predetermined level, to operate in accordance with the predetermined difference, by controlling admission or drainage, respectively, of brake fluid to or from the brake cylinder or cylinders; and (2) is below said predetermined level, for operation in a pulse mode, by controlling pulsed admission or drainage, respectively, of brake fluid to or from the brake cylinder or cylinders by pulsed operation of the control valve.

Thus, a substantial deviation between commanded and actual parameter, for example brake pressure, will cause immediate admission of substantial or highly pressurized brake fluid. As the difference between actual and commanded pressure drops below the predetermined level, pulsed operation will commence so that the commanded value can be approached gradually but rapidly without danger of overshoot, and hence hunting. Also vehicle deceleration or wheel slip may be a useful parameter.

In accordance with a preferred feature of the invention, the magnetic valve arrangement is controlled by a three-point controller having different switching thresholds for ON and OFF positions of the valve which controls admission of pressurized brake fluid, maintenance of pressure, and drainage of pressurized brake fluid, respectively. Additional feedback circuitry may be used and operation can be closely controlled as a function of the difference between commanded and actual pressure.

Certain problems arise particularly in connection with braking of heavy vehicles, such as trucks, buses and the like which, frequently, use compressed air brakes. These problems can readily be handled by the present invention, and can be summarized as follows:

the control loop, even in its operating range between 1–10 bar, is non-linear, caused for example by non-linear pneumatic flow and non-linear pneumatic compressive behavior;

the dynamic behavior of the control loop varies with temperature (this is particularly true for valve membranes), supply pressure, tolerances in manufacture of various elements within the control loop, specific configuration and placement of components in different vehicles, resulting in connecting lines of different lengths and different operating behavior, wear and tear of components, repair and quality of repair, or replacement of parts which may have operating characteristics differing from originally installed parts and, at the time of replacement, will be new, whereas the remaining parts with which the new elements work will probably be worn.

It was previously not possible to compensate or sense all the various influences which affect the proper operation of a braking system in a control loop; some attempts have been made, but they were very expensive.

The method and system of the present invention is self-adaptive or self-learning, which automatically fits itself control matches itself to the then pertaining conditions in the control loop. It is, then,.possible to provide a single control type for a plurality of vehicles operating under different operating conditions and in different operating modes, since the method permits self-adaptation not only to the environment in which the system works but also to the vehicle and its components itself. This has a substantial advantage: The system can be constructed such that it will carry out the method, in large quantity mass production, and used with numerous different types of vehicles, so that saving due to large-scale production can be realized. Further, maintenance of replacement or repair components is facilitated.

High accuracy can be obtained by the system of the present invention, (about $\pm 1\%$ of the supply pressure). The fine control of pressure change at the brake can be achieved within a range of +0.1 bar.

DRAWINGS:

FIG. 8 is a further diagram for explanation of a command pressure definition for determination of pulse length;

FIG. 9 is an illustration of a control loop with course control;

FIG. 11a and FIG. 11b are diagrams to illustrate control operation at an initial operating range; and FIG. 12 illustrates Operating ranges with six different control sub-ranges.

DETAILED DESCRIPTION

Figure 1:
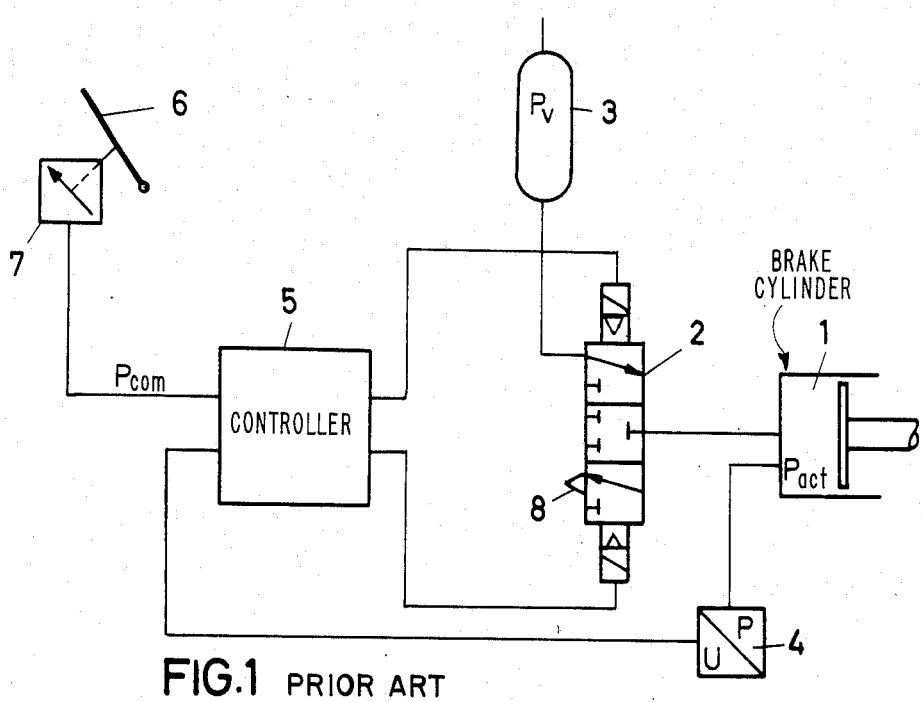
FIG. 1 is a schematic diagram illustrating a known basic principle of brake control, which basic principle is used and refined by the present invention.

First, a description of the basic control system of electrically controlled vehicle brakes, with reference to FIG. 1:

A brake cylinder 1 receives pressurized brake fluid at a pressure $P_v$ from a pressure source 3 through a three-position three-way magnetic valve 2. Magnetic valve 2 has a drain outlet 8. An actual pressure sensor 4 sensing the actual pressure $P_{act}$ converts the actual pressure in brake cylinder 1 into an electrical voltage signal U which is applied to a controller 5. Controller 5 includes a comparator. The controller 5 receives a signal representative of command pressure $P_{com}$ from a position signal transducer 7, which transducer transduces the position of a brake control pedal 6, for example operated by the vehicle operator. The electrical signal supplied from transducer 7 is connected to the controller 5.

The commanded pressure $P_{com}$ is compared in the controller 5 with the actual pressure $P_{act}$. When the difference $\Delta p$ exceeds a predetermined small value in either direction, controller 5 applies energization signals to respective solenoid coils of the valve 2 to either increase pressure in the brake cylinder 1 by admission of pressurized brake fluid from source 3 to the cylinder 1, or draining pressurized brake fluid from the cylinder 1, for example venting compressed air to atmosphere. A typical pressure fluid is air. If neither magnetic solenoid of the valve 2 is energized, the connection between the valve 2 and the brake cylinder 1 is broken, so that whatever pressure existed in the brake cylinder 1 is maintained therein; the pressure remains constant.

Figure 2:
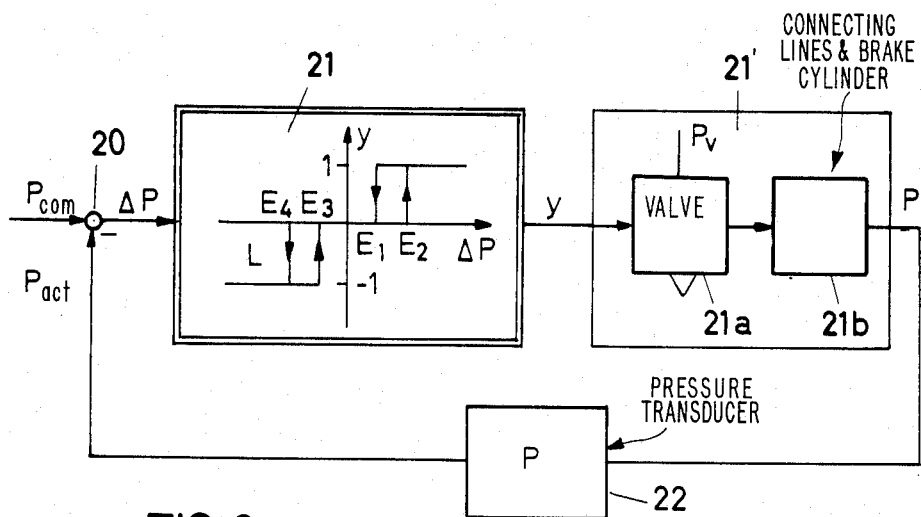
FIG. 2 shows the control loop for the system of FIG. 1.

The control loop of the system of FIG. 1 is illustrated in FIG. 2. The comparison of the pressure signals pact and $P_{com}$ is carried out in a comparator 20 which, in turn, controls a three-point controller 21; the three-point controller 21 provides an output signal to a control path 21' which includes a valve 21a, connecting lines, and the brake cylinder, collectively shown as block 21b. pressure in the brake cylinder is measured by a transducer 22 which supplies an electrical output signal $P_{act}$.

The three-point controller 21 has different switching thresholds for generation of switching signals, shown as thresholds E2 and E4 which form the ON signals, and E1 and E3 which form the Off-signals, these signals being applied to the valve 21a. The respectively different switching signals are provided both for raising of pressure as well as for dropping or draining of pressure. This is commonly referred to as a controller with hysteresis characteristic.

Figure 3:
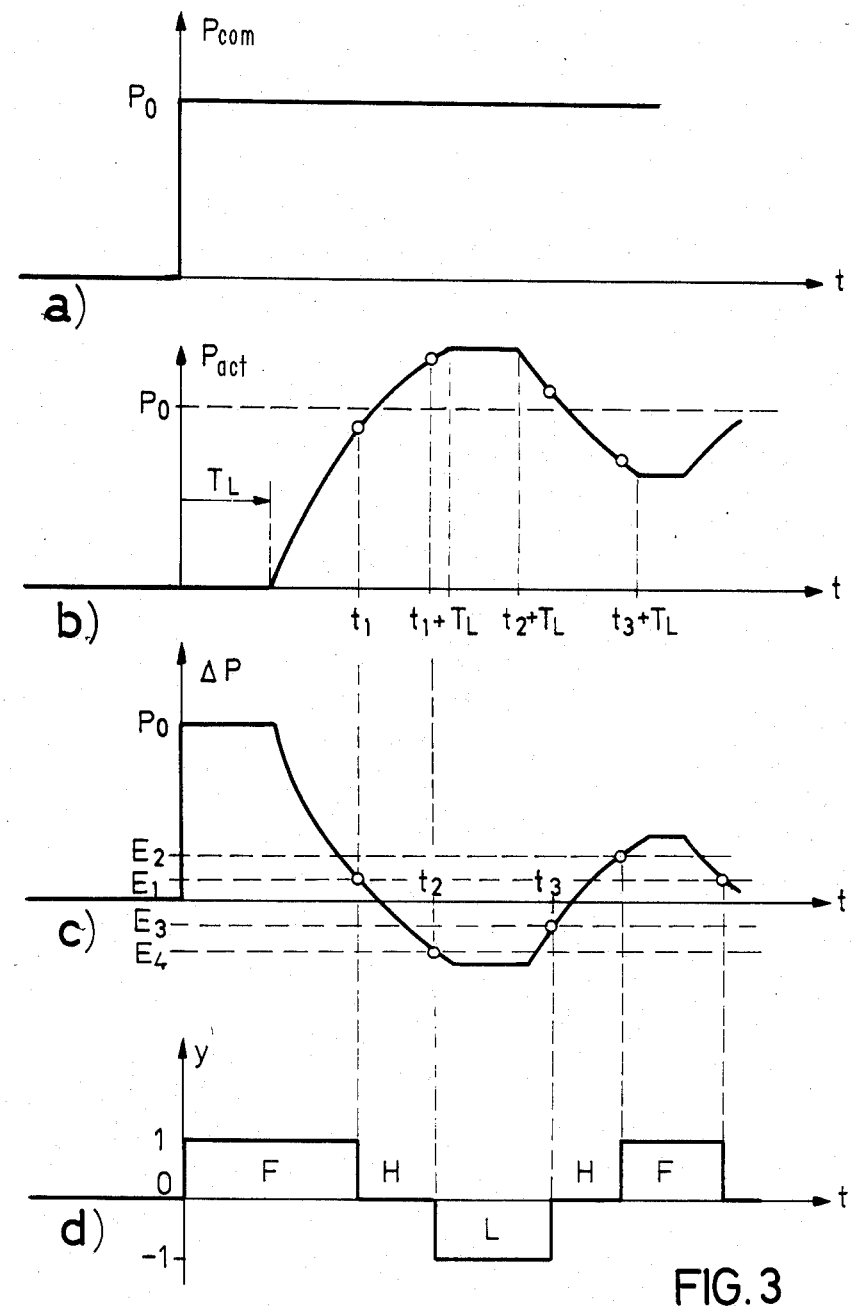
FIG. 3 is a graphic diagram illustrating the operation in accordance with the basic principle.

Basic operation, with reference to FIG. 3:

Graph a of FIG. 3 illustrates the command signal $P_{com}$ which, as shown, is suddenly increased from a reference or zero value to a value $P_O$. The command signal is shown as a single jump. Graph b illustrates the actual change in pressure at the brake cylinder 1 (FIG. 1) or 21b (FIG. 2). As can be seen, the actual pressure is first delayed by a time $T_L$. This is a dead time, caused by the characteristics of all valves, and by the system itself, due to the presence of connecting lines, the volume of brake cylinders, and the like. Thus, pressure increase starts with a delay of the dead time $T_L$ Graph c of FIG. 2 shows the course of the difference $\Delta p$ between the commanded value and the actual value of pressure; graph d show the output signals y derived from the controller 21, which are applied to the valve 2 (FIG. 1) or valve 21a (FIG. 2).

As can be clearly seen, at time $t=0$, a control signal F (graph d) is provided to increase pressure; yet, a change in the difference $\Delta p$ between the commanded and actual pressure will occur only after the dead time $T_L$. The various threshold levels in controller 21 are shown in graph c of FIG. 3. As can be seen, the OFF threshold $E_1$ will be passed at time $t_1$, which causes the valve to revert to basic position, both connections to the pressure source and to the drain being broken, and brake cylinder 1 (FIG. 1) being isolated. At time $t_2$, switching threshold $E_4$ will be passed, and the valve will be commanded to assume the drainage position, see graph d of FIG. 3, graph portion "L", in which pressurized brake fluid is being drained. Due to the dead time $T_L$, pressure continues to rise, however, for the duration of the time $t_1 + T_L$. This causes the command pressure $P_O$ to be exceeded. The pressure remains constant, however, and continues to drop only at time $t_2 + T_L$. The signal terminating at time $t_3$, which is signal L of the threshold $E_3$, becomes effective only at time $t_3 + T_L$ This signal sequence will continue and, as a result, the actual pressure will oscillate several times about the commanded pressure $P_O$.

Figure 4:
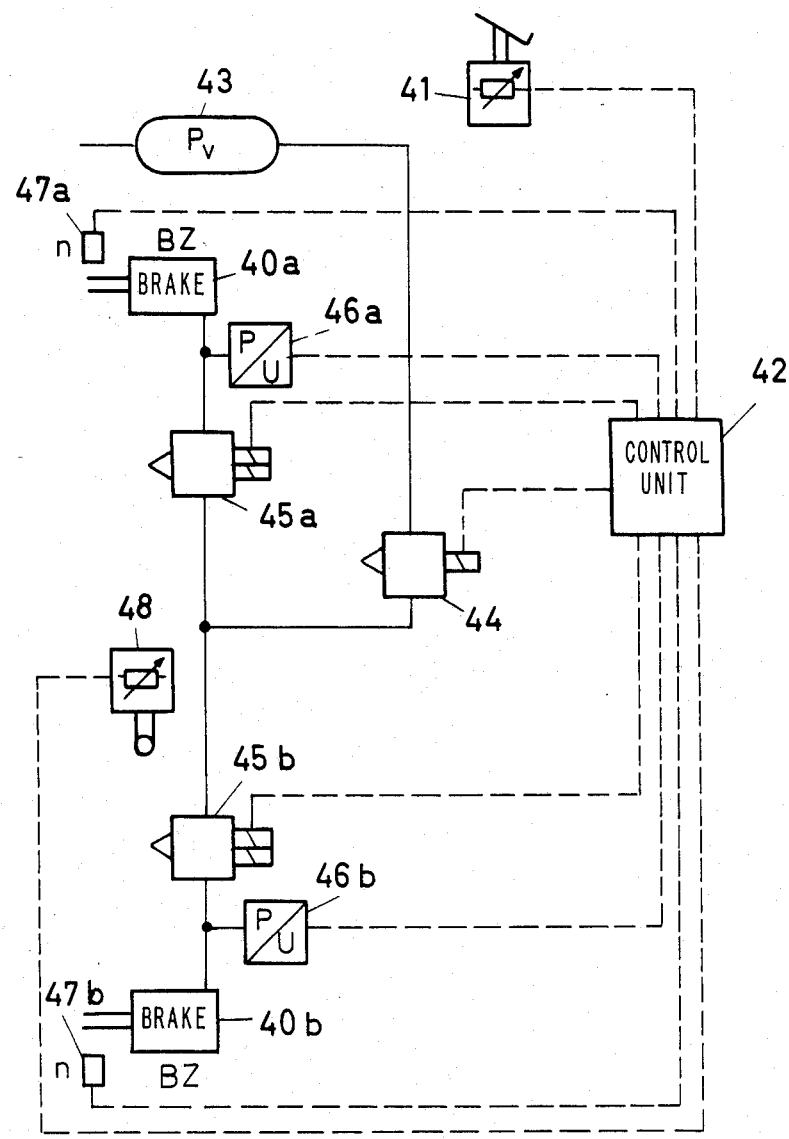
FIG. 4 is a schematic diagram of a system in accordance with the invention applied to the brakes of one axle of a vehicle.

FIG. 4 illustrates a braking system of slightly different configuration. Brakes 40a, 40b for the wheels of one axle of the vehicle are shown. The command value controller is schematically illustrated at 41, providing an electrical command output signal. A control unit 42 receives the electrical signals, as shown by broken lines in FIG. 4. pressurized brake fluid is available from pressure source 43. Control unit 42 controls a pressure supply valve 44 which is a 2/2 valve. Each one of the brakes of the wheels has control valves 45a, 45b associated therewith. The speeds of the wheels are sensed by speed sensors 47a, 47b, respectively. The system also can include an axle loading sensor 48. Valves 45a, 45b permit individual control of the pressure at the respective wheels so long as valve 44 provides pressurized fluid to the inputs of the valves 45a, 45b.

Speed sensors 47a and 47b, valves 45a and 45b and if used, pressure transducers 46a, 46b as well as a portion of the control unit 42 may, together, form a vehicle wheel anti-brake lock system (ABS). The valves 45a, 45b are three-position valves. Pressure sensors 46a and 46b may also be used for slip control, for example in combination with the ABS.

The three-position valve 2 of FIG. 1 is here replaced by valve 44 and the valves 45a, 45b.

In operation, valve 44 provides pressurized brake fluid to the brakes 40a, 40b. Upon energization of valves 45a, 45b into drainage position, pressure is decreased. When valve 44 is de-energized and valves 45a, 45b likewise are de-energized, pressure is maintained at the brakes as previously commanded. The pressure maintenance function is insured by the valve 44 when in its base position. When control is to be applied to any one o the wheels, individually, valves 45a and 45b may accept all control functions. This is well known and to this extent the system is another embodiment of a basic electrically controlled braking system.

In accordance with a feature of the present invention, the control unit 42 is improved to prevent the overshooting and hunting of braking pressure—see graph b of FIG. 3—but, rather, provide for smooth, gradual approach of actual braking pressure to commanded braking pressure.

Figure 5:
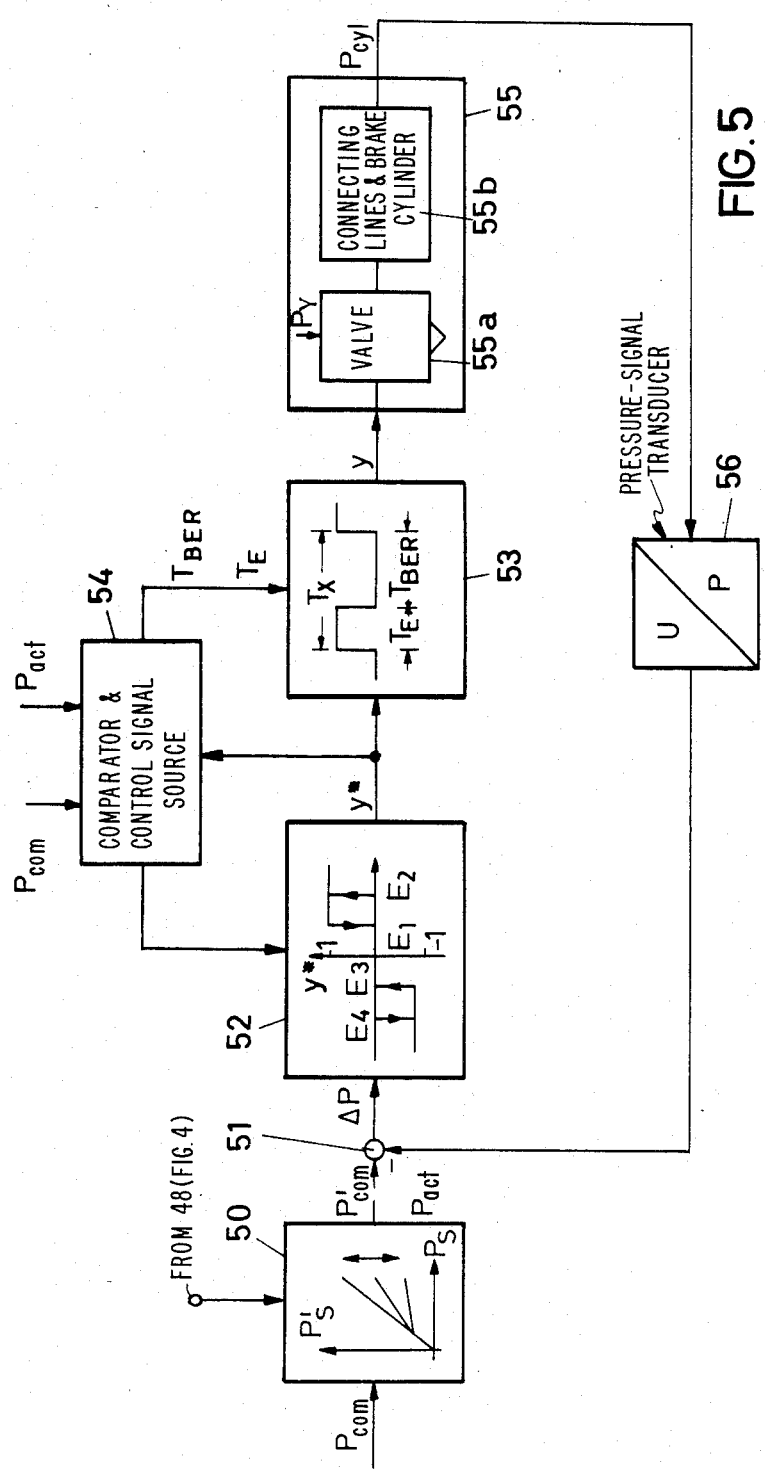
FIG. 5 is a block diagram illustrating the details of the control loop of FIG. 4.

FIG. 5 illustrates a control loop in accordance with the present invention, which can be used in the systems of FIGS. 1 and 4, for example. The control loop shown in FIG. 5, thus, may be used in the control unit 42 (FIG. 4) or in the controller 5 (FIG. 1).

A predetermined command pressure $P_{com}$ is applied to a weighting unit in stage 50, which receives also a weighting signal depending on axle loading, for example from element 48, FIG. 4. The resulting weighted command pressure $P'_{com}$ for the respective axle is applied to a difference forming or subtracting stage 51. The difference $\Delta P'_{com} - P_{act}$ is formed therein, the difference forming circuit 51 receiving an actual pressure signal from a pressure - signal transducer 56. The difference signal $\Delta P$ is connected to a three-point control stage 52 which corresponds essentially to the stage 21 described in connection with FIG. 2. The difference between the stage 52 and stage 21, however, is that the threshold levels E1 to E4 are variable, that is, they can be changed. The output signal from the unit 52, shown as y* is applied to two stages 53 and 54. The output signal y from stage 53 is applied to a magnetic valve arrangement, such as valves 44, 45a, 45b of FIG. 4, shown in FIG. 5 collectively as stage 55a in a block 55. Block 55 includes, besides the valves, connecting lines from the valves and the brake cylinder, shown collectively by block 55b.

Pressure—signal transducer 56 is coupled to the brake cylinder to sense the actual pressure $P_{cyl}$ and to convert the actual pressure at the brake cylinder to an electrical voltage signal pact which is applied as the actual signal to the difference forming circuit 51.

In accordance with a feature of the invention, different operating ranges are commanded by the stages 52, 53, 54, in dependence or whether the controller operates in normal operation, at high braking pressure levels, or, in accordance with a feature of the invention, under a pulse-type braking pressure operation. The high or normal operation is commanded when the absolute value of the pressure difference, that is, the value of the signal from difference forming circuit 51, exceeds a predetermined level; pulse operation is commanded when the value drops below the predetermined level. Since the determination is made based on the difference between commanded pressure and actual pressure, the threshold is denoted $\Delta P_G$. Mathematically:

normal operation: $/\Delta P/ > \Delta P_G$
Pulse operation: $/\Delta P/ \leq \Delta P_G$ Block 54 requires information regarding the level of $\Delta P$, block 54 receives signal representing $P_{com}$ and $P_{act}$. Block 54 compares the signals and provides a difference signal; block 54, thus, can be termed a comparator and control signal source. The block 54 controls operation of stage 53 when the threshold level $\Delta P_G$ is reached.

In normal control operation, the control signals y*, generated by the stage 52, pass unchanged to the stage 53 for passage to stage 55 and control of the valve 55a. When the threshold $\Delta P_G$ is passed, however, and when the apparatus is in pulse operation, stage 53 applies pulsed control signals for the valves for the valve stage 55. The length $T_E$ of the control pulses, and the duty cycle of the control pulses, both for pressure rise as well as for pressure drop, is variable and dependent on various parameters. The subsequent pauses between pulses, of time $T_{BER}$, likewise are variable. The length of the pulses permits smooth and quiet, non-turbulent, non-oscillating operation of the system.

Figure 6:
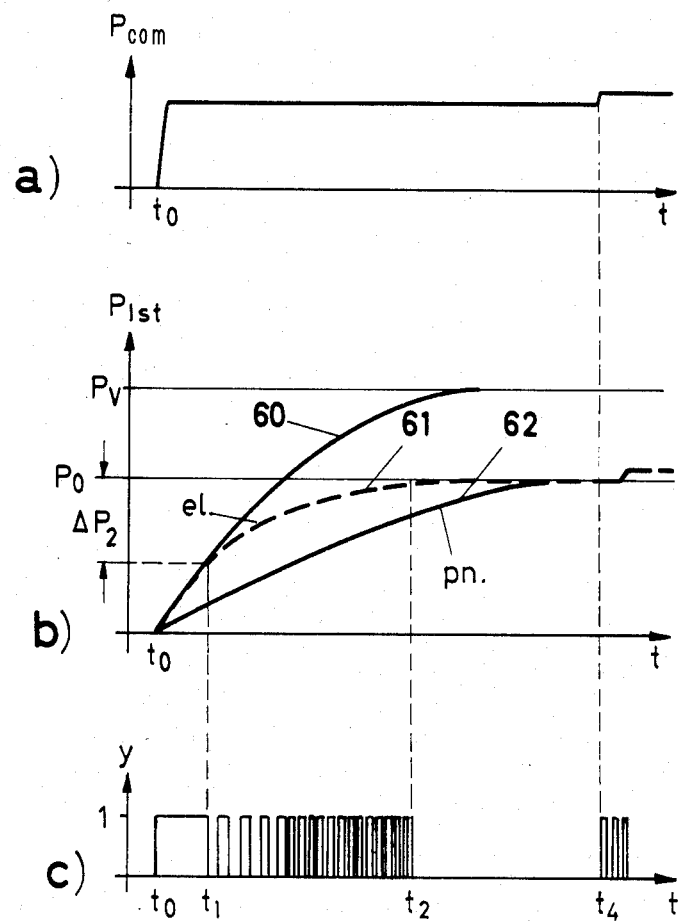
FIG. 6 is a series of graphs illustrating the operation of the embodiment of FIG. 5.

Operation, with reference to FIG. 6: Graph a of FIG. 6 shows the application of a command signal $P_{com}$ to stage 50 occurring at time $t_0$. As shown in the graph, braking pressure is to be commanded. Graph b shows that, at a supply pressure $P_V$, valve 44 - or 55a - will build up pressure, in accordance with the solid-line curve 60. Graph b also shows the course of the pressure rise 61, in accordance with a feature of the present invention. The curve 61 illustrates the pressure course both under normal operation as well as under pulse operation. Solid-line curve 62 shows the course of the pressure obtained by a pneumatic pre-pressure or base pressure $P_0$. FIG. 6 shows that, under normal control operation, that is, during the period $t_0$–$t_1$, the controller in accordance with the present invention - see curve 61 - causes an initial rise which is as rapid as that of the curve 60 without the present invention. The commanded pressure $P_0$ is reached, however, earlier than is the case with curve 62. Graph c shows the control signals y which are applied to the valve stage 55.

At the beginning, that is, so long as $\Delta P$ is greater than the predetermined threshold level $\Delta P_G$, the valve is continuously commanded to supply pressure. This is the period of time between $t_0$ and $t_1$. Thereafter, the valve transfers to pulse operation, with changing pulse widths and pulse intervals until, at time $t_2$, the commanded pressure $P_0$ is reached.

Figure 7A:
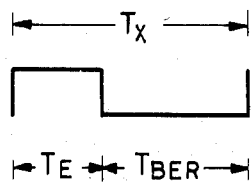
FIG. 7a is a schematic illustration of the timing of a pulse.
Figure 7:
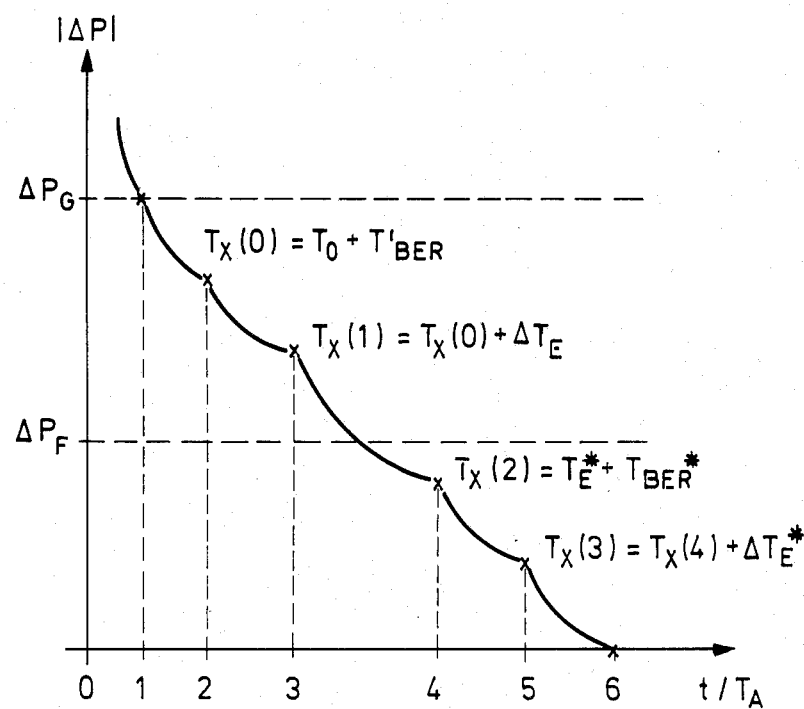
FIG. 7 illustrates a possible course of control deviation in the example of FIG. 5.

In FIG. 7 the time reference is with respect to a constant time $T_A$, forming the scanning or strobing time of the system computer. FIG. 7 shows the course of $\Delta p$ during control.

Normal operation occurs above the reference level $\Delta P_G$. pulse operation occurs in the region of pressure between the level $\Delta p_G$ and the origin of the curve, at 0. The pulse control region is subdivided into two part-ranges, from 0 to $\Delta P_F$ - that is, a fine control range - and between $\Delta P_F$ to $\Delta P_G$, forming the overall, and what might be termed coarse control range. The showing of $/\Delta P/$ illustrates that the approach to the command value is effective both for increasing pressure as well as for decreasing pressure. The pressure level, thus, is deemed to be the absolute pressure, regardless of sign. The diagram does not show a pressure constant or maintenance phases, since in the time periods or phases $T_{BER}$, pressure equalization continues.

As seen in FIG. 7, control of the valve with a continuous signals leads, at the time 1, to the course level limit $\Delta P_G$. At that time, the valve is disconnected, and a quieting period $T_{BER}$ will become effective, that is, between 1 and 2. Thereafter, and triggered by stage 54 (FIG. 5), pulse operation will commence, controlled by stage 53. At time instant 2, the time intervals $T_E$ and $T_{BER}$ which together form $T_{x(0)}$, i.e. form the overall first time interval - see FIG. 7a, are based on previously stored values $T_O$ and $T_{BER}$. In the region between the levels $\Delta P_G$ and $\Delta P_F$, the value $T_x$ is calculated as follows:

$$T_{x(k)} = T_{x(k-1)} + \Delta T_E = T_{E(k-1)} + \Delta T_E + T_{BER} \quad (1)$$

In the above formula k is the number of the step, in the fine control range beginning with 1.

The pulse $T_E$ is made dependent on a preceding pulse time $T_E$ and on $\Delta T_E$. $\Delta T_E$ depends on which sub-range the controls happens to be carried out. For example it depends on $\Delta P_i$, wherein i may indicate the number of sub-control or fine control ranges; additionally, it may depend upon the level of the command pressure $P_{com}$ and on the number n of the pulses which have already occurred in the respective subrange. $\Delta T_E$ can be determined as follows:

$$\Delta T_E = \Delta T (\Delta P_i, P_s) \times 2^{f(n)} \quad (2)$$

Preferably, f(n) is directly n.

The fine control range in which $\Delta P$ is less than $\Delta P_F$ will operate under the same conditions and with the same relationships as given above, with new initial values $T_E^*$ and $T_{BER}^*$ and a new $\Delta T_E^*$.

In actual practice, the command pressure is subdivided into ten ranges. The pressure difference $\Delta P$ is subdivided into two control ranges, coarse and fine, as shown in FIG. 7. Consequently, for pressure rise and pressure drop, 20 values are available for $\Delta P'$ ($\Delta P_i$, $P_{com}$) and $T_O$. They are stored in a non-volatile or read-only memory (ROM) and utilized to calculate $T_E$. FIG. 7 assumes that the command pressure remains constant, that is, changes only within the predetermined band width. It can be seen that $T_x$ increases sharply in the time interval between time periods 3 and 4. This is due to the doubling of the time factor ($2^2=4$).

The fine range, in which $\Delta P$ is less than $\Delta P_F$, that is, in the graph of FIG. 7 at t/TA=4, new initial values $T_E^*$ and $T_{BER}^*$ are used and, thereafter, $T_E^*$ is varied by $\Delta T_E$ and $2^{f(n)}$ until, at t/TA=6, the commanded value is reached. The last value $T_{x(3)}$, which led to the command value ($\Delta P=0$), is stored for later braking, so that, at later comparable braking events ($P_{com}$ is the same), the value $T_{x(3)}$ can be used as the first clock pulse in the fine region when $\Delta P$ is less than $\Delta P_F$. Correspondingly, in the range of pressure between $\Delta P_G$ and $\Delta P_F$, later comparable braking events can be used based on a stored $T_x$ value at which the time $T_x$ changed from the coarse to the fine range, in the example of FIG. 7, $T_{x(1)}$.

It might occur that the last pulse would lead to crossing the line $\Delta P=0$. In a subsequent pulse, the pressure would then be changed in the opposite direction. The time of the last pulse will then be shortened, as will appear, and will be stored for subsequent braking events, that is, braking with similar command pressure $P_{com}$. In the example, $T_{EX} = T_E^* + \Delta E^*$, in which $T_{EX}$ is the crossing time pulse. A correcting time pulse is then calculated:

$$T_{Ecorr} = T_{EX} - [\Delta T(\Delta P_i, P_{com}) + a(\Delta P_i) \cdot / \Delta P^*/] \quad (3)$$

Shortening, thus, will depend on the previously valid $\Delta T'$ and additionally from a value a which, in turn, depends on $\Delta P_i$, that is, the sub-region, and on the value $\Delta P^*$, by which the 0 line was exceeded.

The controller is so arranged that it associates with a predetermined pressure level $P_{com}$ a band width $P_{com} \pm \Delta P$, and, subsequently, maintains this value for $P_{com}$ so long as the band width has not been left. FIG. 8 illustrates, in graph a, the varying command pressure values $P_{com}$ and, in graph b, the command values $P_{com}$ which are actually evaluated by the controller. The command pressure value must be constant so that a command pressure change will be unambiguously associated with a predetermined $T_x$ Pulse. Thus, the command pressure may vary only within the band width $\pm \Delta P$.

The pulses $T_X$ are optimized only if during the entire pulse time ($T_E + T_{BER}$) of the preceding pulse, the command value does not leave the band width of $P_{com+\Delta p}$.

If the output value of the controller shown in FIG. 5 as Y*, after a predetermined interval, has the value zero, the band width limit $\Delta P$ for the command value of the pressure likewise becomes zero. FIG. 8 shows that, starting from time interval $t_3$, the command pressure derived from the operator, typically the driver of the vehicle, is directly utilized as the command value for the pressure regulator. When Y* is not zero, occurring again at time interval $t_4$, the band width values $\pm \Delta P$ are again placed about the pressure command value derived from the vehicle operator or driver.

Figure 10:
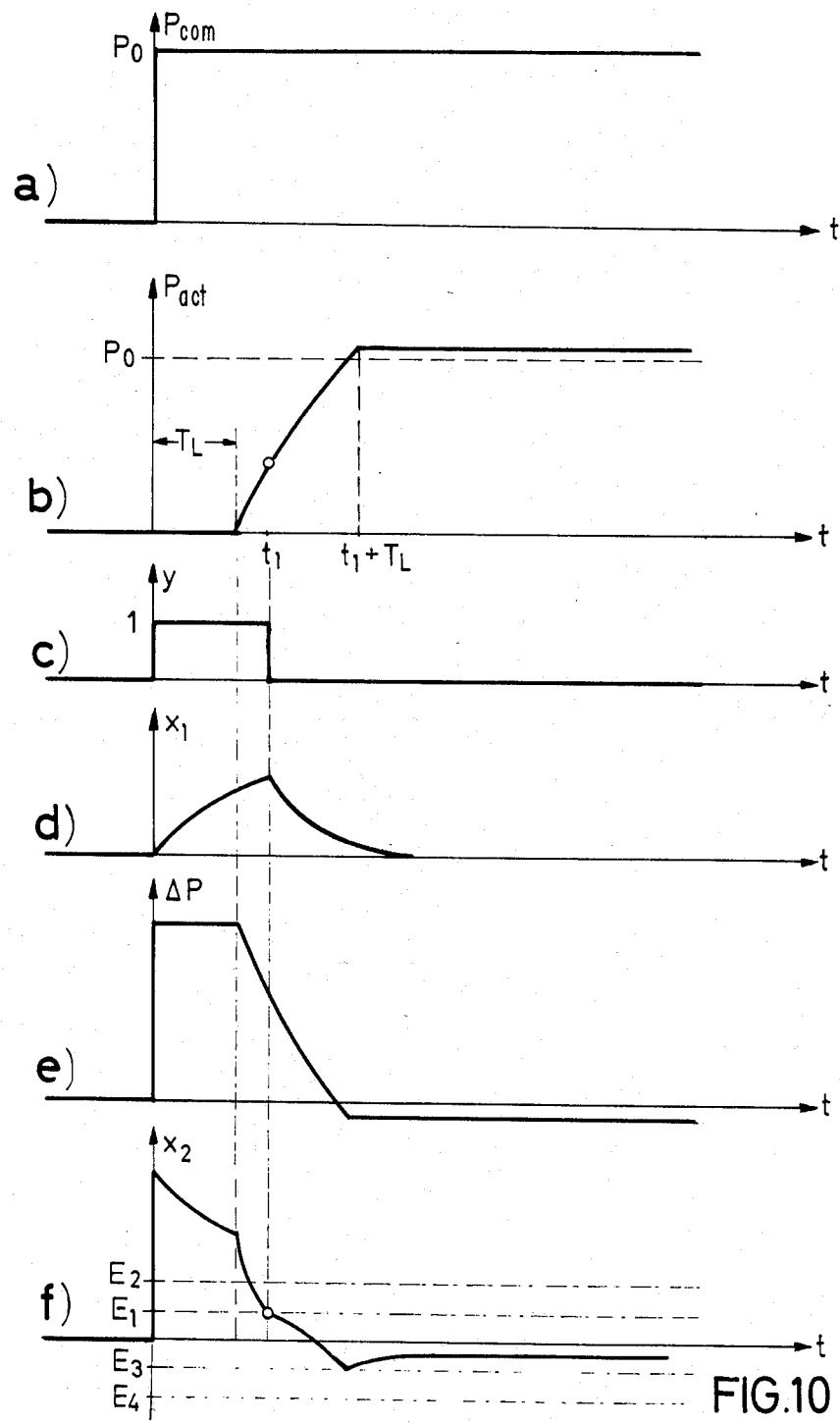
FIG. 10 is a series of diagrams illustrating the operation of the loop of FIG. 9.

FIG. 9 illustrates a further embodiment of the controller 52 of FIG. 5. This controller can be used, for example, for coarse regulation, or entirely independently of use in normal or pulse control ranges. An additional feedback path is provided through stage 93 which, practically, provides a presetting for the controller. A difference forming circuit 92 receives the difference between command pressure $P_{com}$ and actual pressure $P_{act}$, derived from a pressure - signal transducer 91. A control system 90 which, for example, may be similar to the stage 55 of FIG. 5, symbolizes the braking valve and connecting line system. FIG. 10, graph a, shows again the command pressure $P_{com}$, graph b the actual pressure $P_{act}$ and the dead time $T_L$. Graph c shows the switching signal y derived from the controller 94. This switching signal is influenced by the feedback signal $x_1$ of the feedback circuit 93 in a further difference forming circuit 95, see graph d of FIG. 10. The signal, as can be seen in graph d, between 0 and $t_1$, and already at the time $T_L$, during which the pressure difference $\Delta P$ is constant - see graph e - and decreases the input signal $x_2$ of the controller - see graph f. After the dead time $T_L$, the respective signals or influences of $\Delta P$ and $x_1$ superimpose about each other, so that, already at $t_1$, the threshold $E_1$ is being passed in a downward direction. Due to the offset and feedback provided by the signal $x_1$, the pressure is controlled to come close to the commanded value $P_{com}$. The feedback circuit 94 must be matched to the particular system in use.

For coarse regulation, the aim is primarily to reach the desired command pressure value with as few switching signals as possible. Upon optimum matching, this could be accomplished in a single switching cycle. Sufficiently and suitably dimensioned time intervals for quieting insure that, at the termination of the quieting interval, balancing and equalization processes have been terminated so that the then pertaining pressure can be accurately and properly measured. Non-linearities which are included in the system, and other influences, are considered by changes of the parameters in dependence on the command value and by the range of $\Delta p$.

Preferably, an intermediate range is introduced between the normal operating range and the coarse control range if the actual pressure is to be increased, so that the command pressure $P_{com}$ will be greater than the actual pressure $P_{act}$ [$P_{com} > P_{act}$].

The intermediate range will occur in the pressure ranges $\Delta p_G < \Delta P < \Delta P_A$. When the pressure difference $\Delta P_A$ is reached, the valve is disconnected at time $t_0$. After a quieting interval has elapsed, the control deviation $\Delta P$ is measured at the time $t_1$.

The disconnect threshold $\Delta p_A$ is changed for subsequent braking events as follows:

$$\Delta P_A(new) = \Delta P_{A(old)} - a\Delta P; \quad \Delta P_A \geq \Delta P_G \quad (4)$$

$\Delta P$ may be a positive as well as a negative measured value of the control deviation. The value of the variable a also considers nonlinearities in the control loop, for example a may be a function of commanded pressure, or $a = f(P_{com})$.

If, at time $t_1$, $\Delta P > \Delta P_G$, relatively long and variable $T_X$ pulses can be used to bring $\Delta P$ in the range between zero and $\Delta P_G$. FIGS. 11a and 11b illustrate optimization of $\Delta P_A$. $\Delta P_A$ can also be changed under control, for example in dependence on vehicle network voltage or supply pressure, besides the cases illustrated in FIGS. 11a and 11b.

It is possible to subdivide the fine control range in which $\Delta P$ is between zero and $\Delta P_F$ into, for example, the ranges $$\Delta P_F^* \leq \Delta P \leq \Delta P_F \text{ and } 0 \leq \Delta P \leq \Delta P_F^* \quad (5)$$

For the range close to zero, either the same rules as described in connection with FIG. 7 can be used, even if the initial values might be different, but a change from $T_E$ is carried out only after two pulses each.

In contrast to the coarse control range in which is between $\Delta p_G$ and $\Delta p_F$, the fine control range is used primarily to provide for accuracy of adjustment and control.

The respective ranges for pressure control for the above-described embodiments are shown, graphically, in FIG. 12, as follows:

range 6 (BR6): normal operation, that is, continuous valve energization until $\Delta P_A$
range 5 (BR5): used only for pressure increase
range 4 (BR4): coarse control range
range 3 (BR3): fine control range for approach
range 2 (BR2): very fine control range, fine approach
range 1 (BR1): crossover range; $\Delta P$ must be influenced in opposite direction.

In the range 2, the thresholds $E_1$ to $E_4$ (FIGS. 1, 5, 9) of the controller are decreased, which is shown, schematically, by the control connection between stage 54 and stage 52 in FIG. 5.

Preferably, the initial pulses to control the valve in the range in which $\Delta P$ is less than or equal to $\Delta P_G$ is selected to be so small that the valve is just not operated thereby. The pressure sensor then recognizes when the valve has actually responded and has permitted a compressed air package or slugpulse to be passed. This gradual, groping approach permits the system to find the time value which provides for shortest control of the valve and can store this time value or a modified time value for later approaches. The controller thus can determine the optimal values without any specific matching to the system, as for the values for $T_o$, $\Delta T_F$ and $\Delta T_G$, and the so determined values can be stored and used at other braking events. The controller thus is adaptive, that is, is capable of learning from past braking events and can, therefore, match itself to any particular braking system.

The controllers themselves, for example, use suitable microprocessors.

Various changes and modifications may be made, and features described in connection with any one of the embodiments may be used with any of the others, within the scope of the inventive concept. For example, the arrangement of FIG. 9 may be used with that of FIG. 5 and, likewise, the change of threshold levels as described in connection with FIG. 5 can be carried out in the system of FIG. 9.

The pauses between pressure pulses, $T_{BER}$ (FIG. 7a), occur when the valves are not operated, either to admit or drain pressurized brake fluid, typically air. Thus, the pressure level is maintained. These pulses also permit pressure gradients within the fluid in the system including the valves, brake lines, brake cylinders and the like to equalize and thus assist in rendering the system to operate smoothly and based on quieted, uniform pressure conditions.

We claim:

1. A method of braking a vehicle, in which the vehicle has
   a vehicle brake means (1, 21', 40a, 40b, 55, 90) responsive to pressure of a brake fluid for braking the vehicle;
   a brake control means (6, 7; 41) providing an electrical command signal ($P_{com}$) representative of a desired value of a parameter of a vehicle;
   transducer means (4, 22, 46a, 46b, 56, 91) providing an actual signal ($P_{act}$) representative of the actual value of said parameter;
   controlled valve means (2, 21a, 44, 45a, 45b, 55a, 90) controlling, selectively, admission, drainage, or holding of pressurized brake fluid;
   a controller (5; 20, 21; 42, 51, 52, 94) receiving said command signal ($P_{com}$) and said actual signal ($P_{act}$) and providing output signals dependent on the difference ($\Delta P$) between said command signal and said actual signal to control said controlled valve means, said controller including switching threshold levels,
   said method comprising, in accordance with the invention,
   determining if the difference ($\Delta P$) between the signals representing command signal and actual signal exceeds, or is below a predetermined threshold level ($\Delta P_G$) representing a predetermined parameter difference; and, selectively, in dependence on the determined difference ($\Delta P$) with respect to said threshold level ($\Delta P_G$);
   (1) controlling said controlled valve means for operation in continuing manner by, respectively, admission or drainage of brake fluid to or from the controlled valve means
   if the difference between the signals, and representing the pressure difference, is above said predetermined threshold level ($\Delta P_G$); and
   (2) controlling said controlled valve means for operation in pulsed manner by respectively admission or drainage of brake fluid to or from the controlled valve means in pulses, followed by pulse pauses between pulses
   if the difference ($\Delta P$) between the signals representing the pressure difference is below said predetermined threshold level ($\Delta P_G$).

2. The method of claim 1, wherein the predetermined level ($\Delta P_G$) defines a pressure difference range ($\Delta P$) between zero and said predetermined level ($\Delta P_G$) ($0 < \Delta P < \Delta P_G$);
   and said range is subdivided into at least one fine control range having a difference limit ($\Delta P_F$) which is intermediate of zero and said predetermined level ($0 < \Delta P < \Delta P_F$) and a rough control range ($\Delta P_F \leq \Delta P \leq \Delta P_G$).

3. The method of claim 1, wherein (FIG. 7a) the pulses have a predetermined length ($T_E$) followed by a predetermined pause period ($T_{BER}$);
   and including the step of changing the pulse length, starting from an initial value of pulse legnth ($T_0$).

4. The method of claim 3, including the step of changing the length of the pulses as a function of the command signal ($P_{com}$).

5. The method of claim 3, including the step of changing the length of the pulses as a function of said output signals representative of difference between commanded and actual parameter ($\Delta P$).

6. The method of claim 2, wherein said fine control range is subdivided into at least two fine control ranges having a difference limit ($\Delta P_F$)* which is intermediate of zero and said predetermined level ($0 < \Delta P < \Delta P_F$)
   and wherein the changing rates of the pulse length are different in the at least two fine control ranges.

7. The method of claim 4, including the step of allocating a plurality of range to respectively different levels of command signal ($P_{com}$) to define a plurality of command sub-ranges;
   and wherein the changing of the pulse length ($T_E$) is controlled in dependence on which sub-range the then pertaining command signal falls.

8. The method of claim 7, including the step of storing a plurality of changing values for the pulse length $T_E$ which values depend on the different ($\Delta P$) and on the command signal ($P_{com}$);
   and utilizing the stored values in dependence of the present subrange of the difference ($\Delta P$) and of the command signal ($P_{com}$).

9. The method of claim 3, including the step of increasing the length $T_E$ in dependence of the number of pulses needed.

10. The method of claim 3, including the step of controlling the initial pulse length ($T_O$) as a function of at least one of:
    command signal ($P_{com}$);
    then pertaining difference ($\Delta P$).

11. The method of claim 10, including the step of storing a plurality of different initial values of pulse length ($T_O$) dependent of at least one of:
    command signal ($P_{com}$);
    the difference ($\Delta P$),
    and utilizing said so-stored values as initial values for the pulse length ($T_O$).

12. The method of claim 10, wherein the pulse length $T_{E(K)}$ for pressure rise or pressure drop or drainage, respectively, is controlled by the relationship:

$$T_E(1) = T_O(+\Delta P; -\Delta P; P_{com}) \quad (12a)$$

$$T_{E(K1)} = T_{E(K-1)} + \Delta T(+\Delta P; -\Delta P; P_{com}; K) \quad (12b)$$

wherein K is the ordinal number of the pulses and varies from 1 upwards

13. The method of claim 12, wherein the change in the pulse length is defined by $$\Delta T = \Delta T_E(+\Delta P; -\Delta P; P_{com}) \cdot 2^{f(n)} \quad (13)$$

wherein n is at least one of: number of pulses.

14. The method of claim 2, wherein, if the difference output signal ($\Delta P$) changes in sign, a pulse of reverse polarity with respect to an immediately prior pulse is provided and wherein a pulse which is shorter than the last pulse ($T_{EX}$) resulting in crossing the zero pressure difference level is generated and stored for recall at a subsequent braking event.

15. The method of claim 14, wherein the pulse of reverse polarity which is being stored is defined by:

$$T_E(\text{CORREC}) = T_{EX} - [\Delta T' + a(\Delta P) \cdot |\Delta P^*|]$$

wherein
$\Delta T'$, is a time period depending on a starting range;
a is a function of the difference out signal ($\Delta P$);
$\Delta P^*$ is the deviation of the difference between a $\Delta P$ from zero level; and
$T_{EX}$ is the length of the last pulse.

16. The method of claim 1, including the steps of associating a small band width ($P_{com} + \Delta P_S$) with the incoming command signal $P_{com}$ of the controller, and generating a constant output signal $P_{com}$ of the controller as long as the incoming command signal $P_{com}$ falls within the said band width; and wherein $\Delta P_S$ is a given constant.

17. The method of claim 2, including the steps of associating a small band width ($P_{com} + \Delta P_S$) with the incoming command signal $P_{com}$ of the controller, and generating a constant output signal $P_{com}$ of the controller as long as the incoming command signal $P_{com}$ falls within the said band width;

wherein $\Delta P_S$ is a given constant.

and wherein respective control ranges have different band widths.

18. The method of claim 1, including the steps of storing data representative of the pulse length ($T_E$) which resulted in an effectively zero output difference signal ($\Delta P$);

and utilizing that so-stored pulse length at a braking event subsequent to said storing step in which command signals ($P_{com}$) and actual signals ($P_{act}$) occur which are comparable to command and actual signals which resulted in said effectively zero output different signal.

19. The method of claim 1, wherein the interval length of the pause ($T_{BER}$) subsequent to a pulse is variable to provide a time period for the vehicle brake means to approach a quiescent operating level.

20. The method of claim 1, wherein said controller is a three-point controller having different valve control switching thresholds to operate the respective controlled valve means for opening or closing, respectively, whereby said valve means will operate with hysteresis.

21. The method of claim 20, including a step (FIG. 9) of feeding back a signal representative of control signals (y) controlling said controlled valve means to the controller input to modify said different output signal ($\Delta P$) in a direction to decrease the difference output signal by a continuously increasing feedback signal until said predetermined level ($\Delta P_G$) is reached.

22. The method of claim 21, wherein the increase in the level of the feedback signal is selected for effectively approaching the commanded signal ($P_{com}$) by the actual signal ($P_{act}$) by a signal valve operation.

23. The method of claim 2, wherein said controller is a three-point controller having different valve control switching thresholds to operate the respective controlled valve means for opening and closing, respectively, whereby said valve means will operate with hysteresis;

including a step (FIG. 9) of feeding back a signal representative of control signals (y) controlling said controlled valve means to the controller input to modify said difference output signal ($\Delta P$) in a direction to decrease the difference output signal by a continuously increasing feedback signal until said predetermined level ($\Delta P_G$) is reached; and wherein said increase in the feedback value is selected to provide for control of the controlled valve means for a single operation and to bring the output difference signal ($\Delta P$) within the fine control range.

24. The method of claim 2, wherein said controller is a three-point controller having different valve control switching thresholds to operate the respective controlled valve means for opening or closing, respectively, whereby said valve means will operate with hysteresis;

and wherein the hysteresis threshold levels for operation of said controlled valve means are changed to lower values upon sensing that the difference signal ($\Delta P$) is within said fine control range.

25. The method of claim 1, wherein the command signal ($P_{com}$) and the actual signal ($P_{act}$) correspond to pressure values.

26. The method of claim 1, wherein (FIG. 4) said control unit includes an anti-brake lock system (ABS) controller.

27. The method of claim 26, wherein the command signal ($P_{com}$) and the actual signal ($P_{act}$) correspond to pressure values, wherein the vehicle has brake pressure transducer means and wherein said brake pressure transducer means are also used within the antibrake lock system.

28. The method of claim 1, wherein the step (2) of controlling operation of the controlled valve means in pulses comprises establishing a further control range $\Delta P_G < \Delta P < \Delta P_A$ above said predetermined pressure level ($\Delta P_G$) if the actual signal ($P_{act}$) is less than the command signal ($P_{com}$) resulting in increase in braking pressure;

wherein a different pulse width ($T_O$) of the initial pulse is provided for this further range; and wherein $\Delta P_A$ is a given value.

29. The method of claim 28, wherein said further control range is defined by a range limit ($\Delta A$) above said predetermined limit ($\Delta P_G$).

30. The method of claim 28, wherein the value of $\Delta P_A$ is optimized by correcting said value of $\Delta P_A$ by the product a·$\Delta P$ and wherein a is a system parameter.

31. The method of claim 3, wherein the pulse width of said first pulse ($T_O$) is controlled to be so short that the controlled valve means will not respond within the pulse width until a subsequent, corrected pulse with a longer pulse width occurs;

and including the step of storing data representative of the subsequent, corrected pulse width.

32. The method of claim 1, including (FIG. 8) the steps of associating a small band width ($P_{com} + \Delta P$) with a command value ($P_{com}$) received from the controller, wherein $\Delta P_S$ is a predetermined constant defining said band width;

controlling the pulse length of subsequent pulses only if the command value during the entire predetermined pulse and pulse gap periods ($T_E + T_{BET}$) is within said small band width;

sensing if the output signals (y) from the controller was zero or null for a predetermined time interval;

and, thereafter, controlling the pressure being applied to said controlled valve means as a function of the command signal ($P_{com}$) without regard to said band width.

33. The method of claim 1, wherein said brake fluid comprises compressed air.

34. Braking system for a vehicle, in which the vehicle has a vehicle brake means, responsive to the pressure of a brake fluid for braking the vehicle;

a brake control means providing an electrical brake command signal representative of a desired value of a parameter of the vehicle;

transducer means providing an actual signal ($P_{act}$) representative of the actual value of said parameter;

controlled valve means controlling, selectively, admission, drainage or holding of pressurized brake fluid;

a controller receiving said command signal and said actual signal forming an output difference signal dependent on the difference between the command and actual signal, and providing output control signals (y) to control said controlled valve means, said controller having valve control switching thresholds at which the controller changes its output signal, comprising means for determining if the difference ($\Delta P$) between said command signal and said actual signal representing commanded and actual values exceeds or is below a predetermined threshold level ($\Delta P_G$) representative of a predetermined parameter difference;

and means for controlling said controlled valve means, selectively in dependent on the determined difference ($\Delta P$) with respect to said predetermined threshold level ($\Delta P_G$)

(1) for continued admission or drainage of brake fluid to or from said controlled valve mean if the absolute value of the difference ($\Delta P$) is above said predetermined threshold level ($\Delta P_G$); and (2) for controlling said controlled valve means for admission, or drainage, respectively, of brake fluid to or from said controlled valve means in pulses, followed by pulse pauses during which brake fluid is not admitted to, or drained from said valve means, if the absolute value of the difference ($\Delta P$) is below said predetermined threshold level ($\Delta P_G$).

35. The system of claim 34, wherein said controller comprises a three point pressure rise - pressure hold - pressure drop controller having hysteresis;

and wherein said controller includes means (54) for controlling the levels or thresholds at which it changes its output signal.

36. The system of claim 34, including (FIG. 9) a feedback circuit (93) feeding back the control signals (y) from said controller to modify the difference signal ($\Delta P$) in a direction to decrease the difference signal as the feedback signal increases until a predetermined difference threshold level ($\Delta P_G$) is passed.

* * * * *